Nov. 11, 1969  P. D. OLSON  3,478,159
COLLAPSIBLE KEYBOARD TEACHING AID EMPLOYING
EARPHONE SETS AND PLURAL KEYBOARDS
Filed March 29, 1967  4 Sheets-Sheet 1

INVENTOR.
PERCY DEAN OLSON
BY Burd, MacEachron, Braddock,
Bartz & Schwartz
ATTORNEYS

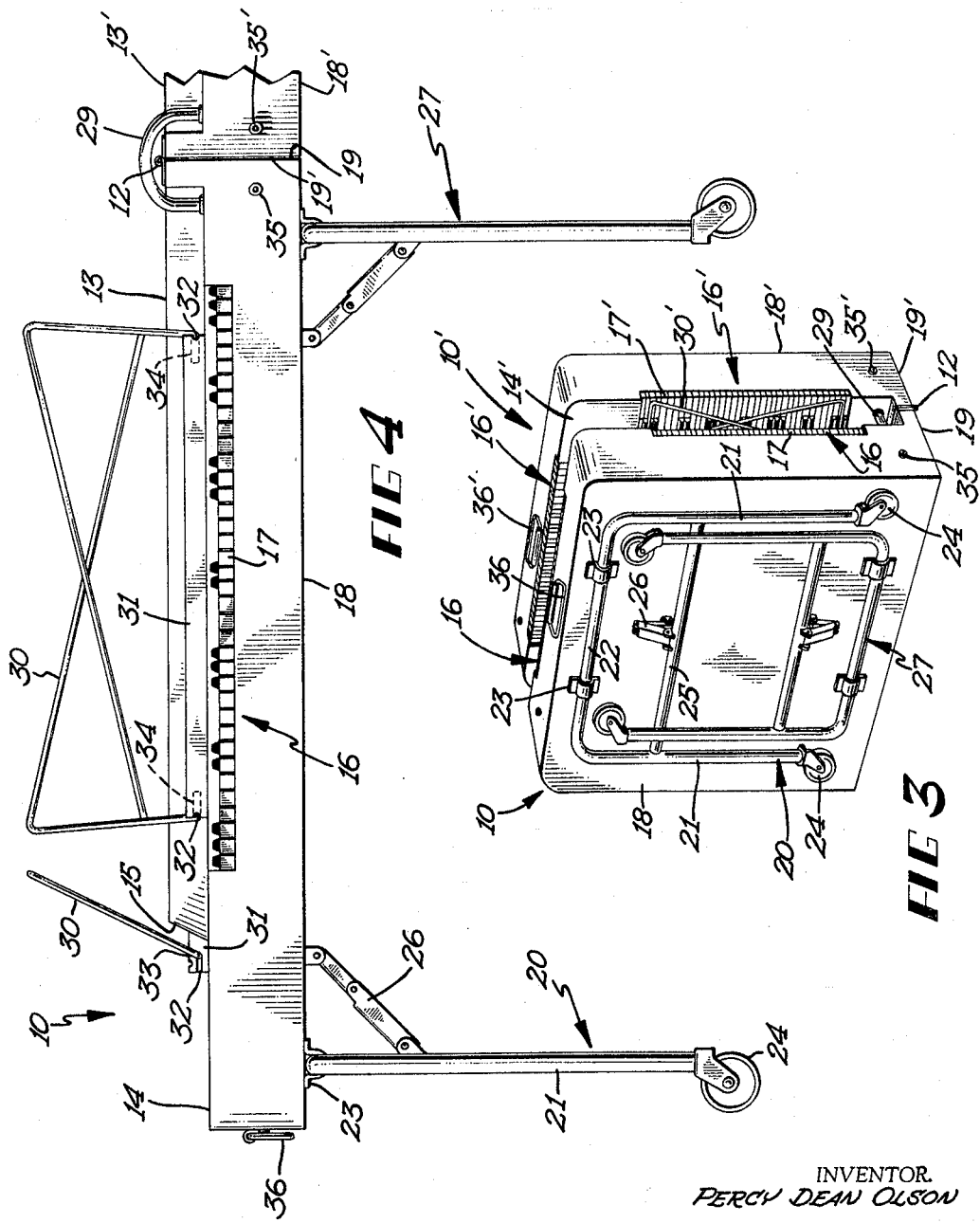

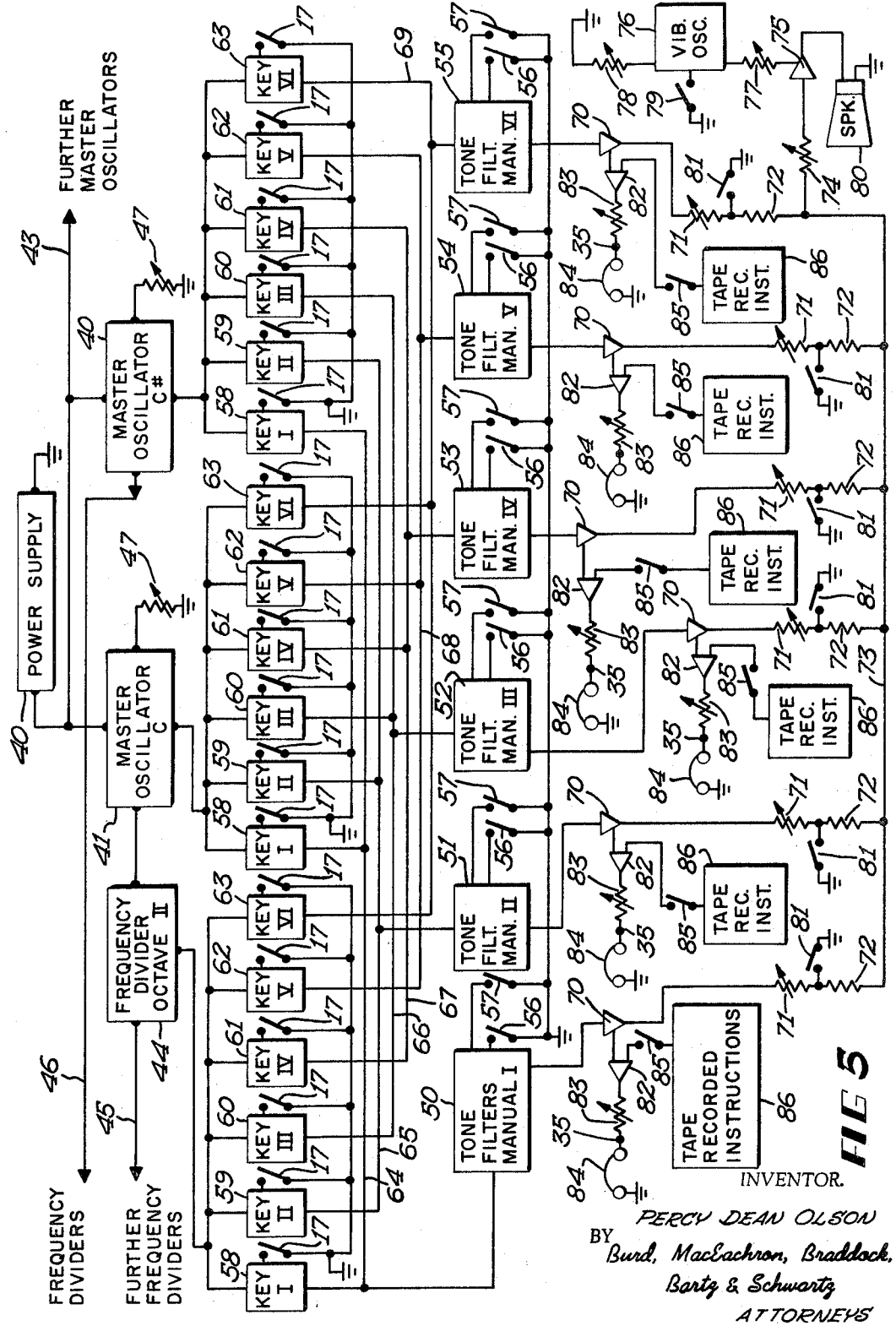

INVENTOR.
PERCY DEAN OLSON
BY Burd, MacEachron, Braddock,
Bartz & Schwartz
ATTORNEYS

United States Patent Office 3,478,159
Patented Nov. 11, 1969

3,478,159
COLLAPSIBLE KEYBOARD TEACHING AID EMPLOYING EARPHONE SETS AND PLURAL KEYBOARDS
Percy D. Olson, Rte. 4, Oakview Drive,
Owatonna, Minn. 55060
Filed Mar. 29, 1967, Ser. No. 626,894
Int. Cl. G10h *3/06, 3/00;* G10c *1/00*
U.S. Cl. 84—1.17                                12 Claims

ABSTRACT OF THE DISCLOSURE

A transportable multiple keyboard teaching aid wherein each of the keyboards is connected to an electronic sound producing system which may either produce sounds from all of the keyboards through a single speaker system or through individual earphone sets. The teaching aid has six individual keyboards and all the electronics in two hinged sections adapted to be supported on various leg structures and folded for transporting from place to place.

BACKGROUND OF THE INVENTION

This invention relates to teaching aids, and more particularly to multi-keyboard electronic sound producing teaching aids.

Many teaching aids have been developed for utilization in teaching music to students. Some prior art devices utilize a series of lights to indicate that a pupil is properly following the instructor on a separate keyboard. Other devices have utilized a phonograph or other prerecorded music for accompaniment or teaching of students by simultaneous playing of the recorded music with the student's practice.

Additional prior art devices have included electronic organs having multiple keyboards and separate speaker systems for each keyboard in one case. Such systems are relatively expensive and are not readily movable. None of the prior art devices have, however, provided a multiple keyboard device in which each of the keyboards is functionally operable to produce sounds, yet which is designed so that it may be readily transported from place to place.

SUMMARY OF THE INVENTION

Briefly, this invention provides a multiple keyboard teaching aid in which each of the keyboards is operatively connected to an electric mechanism for producing sound. The device is entirely contained within an enclosure which includes portions movable between an open position exposing the keyboards for play and a closed position in which the teaching aid is readily transportable from place to place. The enclosure can be used with a number of different support structures to maintain the keyboards at playing height when the enclosure portions are in the open position and to make the device readily movable through doorways by carrying or rolling it when the enclosure portions are in the closed position. An additional feature of the invention is that only one set of tone generators is used while each keyboard is connected to its own tone filtering system so that sounds resulting from depression of keys in different keyboards have voice qualities of different instruments. In that manner, students playing two or more of the keyboards can achieve sounds through the single speaker system which are representative of two or more instruments being played simultaneously. For example, one keyboard may be connected so as to produce tones representative of a violin while others may be connected so as to produce those representative of a cornet, a flute, other horns, or other stringed instruments. A further feature of the transportable teaching aid is that the sounds may be produced either through the central speaker system wherein sounds from all of the keyboards are combined into a composite result or through earphones so that each student hears only his own playing. Recorded instructional material can be introduced into the earphones as the student plays so that he can individually compare his playing to an instructional standard.

BRIEF DESCRIPTION OF THE DRAWINGS

FIGURE 3 is a perspective view of the teaching aid of FIGURE 1 in the fully closed position suitable for carrying from place to place;

FIGURE 4 is a side view of a portion of the teaching aid of FIGURE 1;

FIGURE 5 is a block diagram schematic illustration of the circuits utilized in the teaching aid.

DESCRIPTION OF THE PREFERRED EMBODIMENTS

Figure 1:
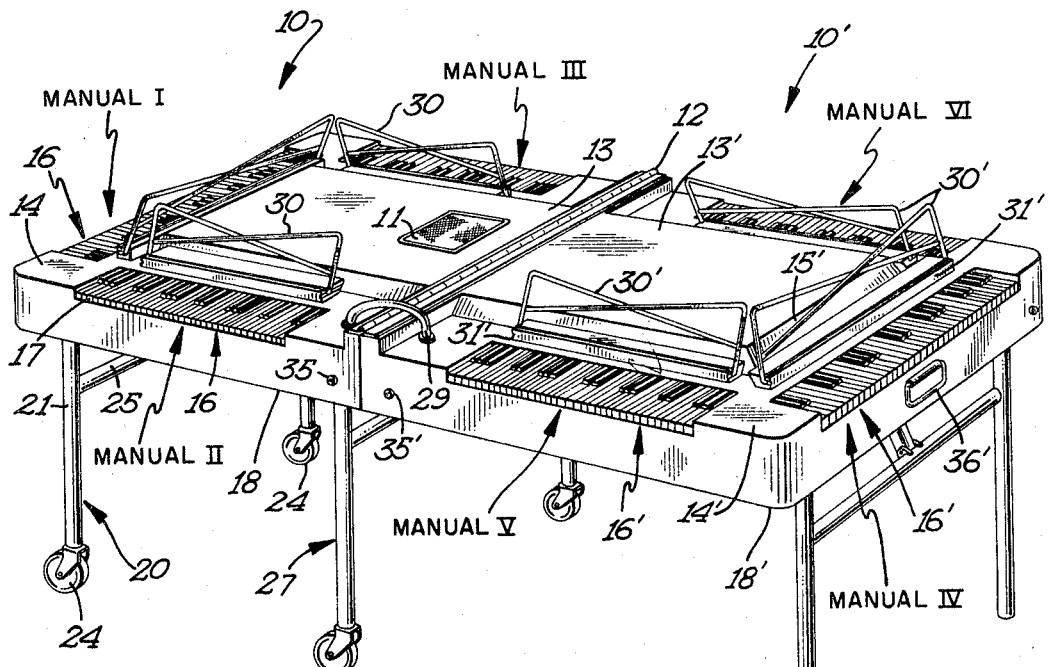
FIGURE 1 is a perspective view of the multiple keyboard teaching aid of the invention in the open position ready for play.

The mechanical structure of the multiple keyboard teaching aid can be seen from FIGURES 1 through 4. The teaching aid is enclosed in a case having two virtually identical portions 10 and 10' which are hinged together by a hinge 12. Case portions 10 and 10' can be constructed from any of a number of suitable materials such as wood or molded plastic. Since portions 10 and 10' are virtually identical when viewed from the exterior, only one portion will be fully described. Case portion 10 has an upper face with a first part 13 adapted to contact a first part 13' of the upper face of portion 10' when the teaching aid is in the closed position. The first part of 13 is connected to a recessed peripheral part 14 of the upper face by a slanted connecting part 15. Recessed peripheral part 14 contains at least one keyboard, generally designated 16. In the whole structure as shown, there are six keyboards 16 which are designated as Manuals I–VI. Each keyboard contains a plurality of keys 17. In the preferred structure, thirty-seven keys are provided so that one note more than three octaves can be played. This provision of thirty-seven notes covers the entire normal voice range and is particularly helpful in utilizing the teaching aid to correlate sounds made from depressing keys on the keyboard and vocal sounds.

Case portion 10 also has a lower face 18 an and end 19 which is adapted to abut end 19' of case portion 10' when the case is in the open position. Attached to lower face 18 is a first foldable support structure, generally designated 20, including a pair of legs 21, connected by a pivoting horizontal connecting bar 22, a pair of brackets 23 fastening bar 22 to lower face 18, a pair of rollers or wheels 24 at the lower extremity of each of legs 21, a horizontal bracing bar connected between legs 21. A foldable locking arm 26 is connected between brace 25 and lower face 18.

In the open position, legs 21 extend downwardly from lower face 18 and are held rigidly in position by arm 26 which is fully extended. As support structure 20 is folded toward lower face 18, arm 26 folds in half and legs 21 are rotated with bar 22 until they are positioned flush with lower face 18. A second support structure 27 is constructed identically with support structure 20. In order that both support structures fit flush against lower face 18, support structure 27 can be attached to lower face 18 offset from structure 20 by a distance sufficient to allow both pairs of legs to simultaneously contact lower face 18. Alternately, support structure 27 can be constructed with a horizontal connecting bar which is either slightly shorter or slightly longer than bar 22 so that both legs of support structure 27 lie either inside or outside of legs 21. A third support structure 28 is rotatably attached to case portion 10'. Support structure 28 is identical to structure 20 in all respects except that its legs are slightly longer than legs 21 so that the legs of structure 28 directly contact the floor without rollers. The lack of rollers on support structure 28 contributes to the stability of the teaching aid in the fully open position, since it is not readily moved about. An electrical connecting means, here shown as cable 29, connects the portions of the electronics in portions 10 and 10' together.

Associated with each keyboard of the teaching aid is a wire music rack 30. Music rack 30 is mounted in a block 31 which is normally constructed of the same material as case portion 10. Block 31 abuts slanted portion 15 immediately adjacent keyboard 16 and has a first pair of grooves 32 horizontally disposed parallel to the keyboard, and a second pair of grooves 33 which slant back and upwardly parallel to slanted portion 15. Block 31 also contains a pair of holes 34 at the junction of groove 32 and groove 33.

Wire music rack 30 has inwardly turned lower ends which fit into holes 34. Rack 30 is constructed so that it is spring biased tightly against the side of block 31 and maintains two stable positions; one in grooves 32 and the other in grooves 33. When music rack 30 is positioned with the wires lying in grooves 32, the rack extends outwardly over the keyboard and is below first part 13 so that the teaching aid can be closed without damaging the racks. When rack 30 is positioned with the wire lying in grooves 33, it abuts slanted portion 15 and is in position to retain sheet music used by the student as he plays on keyboard 16. If desired, the upper surface of block 31 may contain one or more longitudinal grooves adapted to help retain the sheet music.

Case portion 10 also contains a plurality of earphone jack receptacles 35 for connection to earphones and privately listening to the sounds produced by playing of the adjacent keyboard 16. A carrying handle 36 is attached to the end of case portion 10 which is opposite end 19.

Disposed in first part 13 of the upper face of case portion 10 is a covered aperture 11 which is covered with sound transmitting material such as cloth or other woven material. Covered aperture 11 can be positioned on lower surface 18 if desired. Its purpose is to provide a mounting for a speaker so as to project the sounds resulting from depression of keys 17 out of case portion 10.

Figure 2:
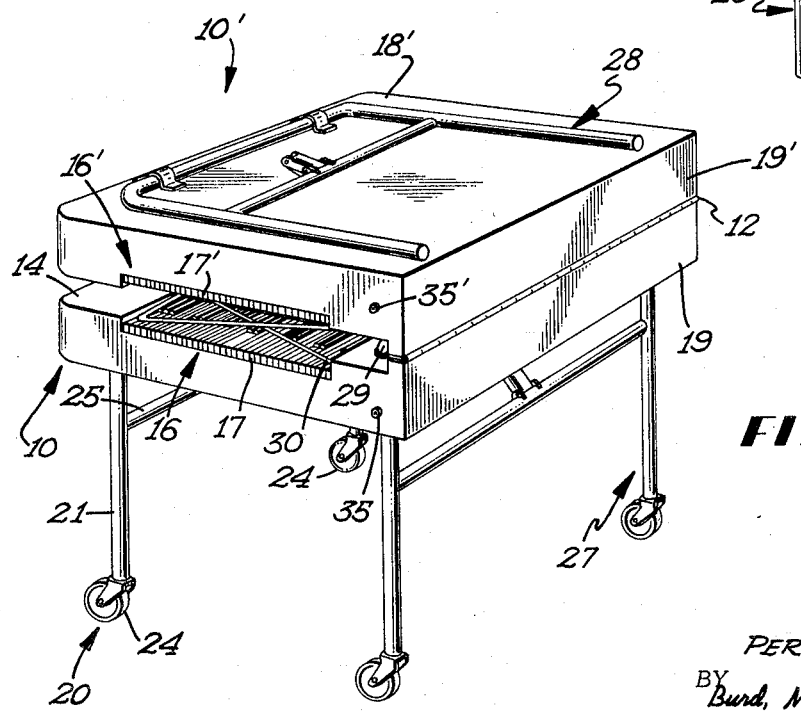
FIGURE 2 is a perspective view of the teaching aid of FIGURE 1 in a partially closed position suitable for rolling from place to place.

The procedure for opening and closing the teaching aid can be seen most easily from consideration of FIGURES 1-3. It is assumed that the teaching aid is originally in the open position as shown in FIGURE 1. In that position, support members 20, 27 and 28 are fully extended downwardly and support the keyboards at playing height. Portions 10 and 10' abut one another with ends 19 and 19' in abutting relationship. Music racks 30 are disposed in grooves 33 in position to hold sheet music. Closing the teaching aid is accomplished in the following manner: each of music racks 30 is rotated from the open position to the closed position so that the side wires of the rack slip into grooves 32 so that the teaching aid has first parts 13 and 13' as the uppermost surfaces. Portion 10' is grasped by handle 36' and is rotated about hinge 12 until first part 13' contacts first part 13. Support structure 28 is then folded down flush against lower face 18'. The position thus achieved is shown in FIGURE 2.

In this partially closed position, the teaching aid is readily rollable on the rollers of support structures 20 and 27. The case is designed so that it can be rolled through normal doorways when in the position shown in FIGURE 2.

Often it is desired to move the teaching aid from place to place in an extremely compact structure. In such situations, the case can be fully closed as shown in FIGURE 3. To accomplish this, case portions 10 and 10' are lifted by handles 36 and 36' and set on ends 19 and 19'. Support structures 20 and 27 are next folded flush against lower face 18. When so folded, the entire case structure in one embodiment constructed, is approximately 30" wide, 30" high and 14" deep and weighs about 100 pounds so that it can readily be transported in an automobile.

The electronics for the teaching aid are entirely enclosed within case portions 10 and 10'. The electronics are powered by attachment to a 115–120 volt electrical outlet through a plug-in cord, not shown. The plug-in cord can emerge from any point on the case and, if desired, can be retractable when not in use. Such cords and retracting means are well known and will not be further described. FIGURE 5 schematically illustrates, in block diagram form, some of the electronics which are positioned within case portions 10 and 10'.

The sound producing system of the teaching aid is powered by a power supply 40 which can be plugged into any 115–120 volt electrical outlet by a plug, not shown. Power supply 40 contains a power on-off switch, also not shown, for turning the entire teaching aid on and off. Power supply 40 converts the AC line current to filtered DC and is connected to drive a series of master oscillators which produce the twelve tone scale. Two of the twelve master oscillators are shown in FIGURE 5. They are master oscillator 41 which produces the note C and master oscillator 42 which produces the note C♯. An arrow 43 indicates that the power supply is connected to further master oscillators for producing the notes D, D♯, E, F, F♯, G, G♯, A, A♯, and B. The additional master oscillators are not shown because of space limitation and because they are connected into the circuit in the same manner as oscillators 41 and 42. Twelve tone generators suitable for use as the twelve master oscillators are available on the commercial market. Each master oscillator produces a square wave form which is translated into the proper wave shape by tone filters. Each master oscillator block also contains a wave shaping network and a sync amplifier to provide sufficient gain to drive the other stages.

The twelve master oscillators generate one complete octave of tones. The keyboards utilized in the teaching aid of the invention each contain thirty-seven keys so that slightly more than three octaves are required. The other notes are produced by driving a series of frequency dividers from each master oscillator since notes separated by one or more octaves are integral frequency multiples. One such frequency divider 44 is shown connected to master oscillator 41. Again, a number of suitable circuits can divide the frequency from master oscillator 41 in half, the function required of frequency divider 44. One means of accomplishing this frequency division by use of a driven flip-flop circuit. The output of frequency divider 44 is a signal with one-half the frequency generated by master oscillator 41. This signal represents the note C one octave below that produced by master oscillator 41. Each master oscillator drives a plurality of frequency dividers to produce the thirty-seven note range. An arrow 45 indicates that master oscillator 41 and frequency divider 44 drive a further frequency divider to produce the third octave. Arrow 46 from master oscillator 42 indicates that master oscillator 42 drives frequency dividers for generating the second and third octaves of the note C♯. Since the keyboards contain thirty-seven keys, one of the master oscillators is required to drive three frequency dividers. All of the frequency dividers are preferably constructed of identical circuit modules. The entire thirty-seven note range for all six keyboards of the teaching aid is produced by this one set of master oscillators and frequency dividers. Each master oscillator is operatively connected to a variable resistor 47 for fine adjustment of the oscillation frequency.

Each of the six keyboards on the teaching aid has associated with it a series of tone filters which produce a chosen voice quality for all of the thirty-seven notes of that keyboard. A set of tone filters 50 is associated with the keyboard 16 which is designated Manual I. Specific circuitry for the tone filters is readily available on the commercial market. These filters can consist of passive networks containing resistors and capacitors. The other five keyboards, which are indicated as Manuals II, III, IV, V, and VI, have tone filters 51, 52, 53, 54 and 55 associated, respectively, with each of them. Each of tone filters 50 through 55 produces the same distinctive voice quality for each note of the keyboard with which it is associated.

As shown in FIGURE 5, each of tone filters 50–55 contains a plurality of filter networks which provide a selection of voices for each Manual. Choice of the voicing is made by closing one of switches 56 and 57 thereby operatively connecting one of the plurality of filter networks into the system. If desired, the circuit can be wired so that both switches 56 and 57 may be depressed simultaneously thereby yielding a tone which is a composite of the two voices. Preferably, each of the tone filters 50–55 is capable of producing a different voice quality so that students at each of the six keyboards produce tones representative of different instruments. Examples of the voice qualities which can be produced are flute, reed, cornet, viola, trombone, and horn. The number of switches like 56 and 57 which are provided at each Manual depends upon the versatility desired in each keyboard.

Each master oscillator and frequency divider is operatively connected to the tone filtering systems of each of the six Manuals through keying circuits. These keying circuits are shown in block diagram form in FIGURE 5. A keying circuit 58 connects oscillator 41 to tone filters 50. Further keying circuits 58 connect each master oscillator and frequency divider to tone filters 50. A series of keying circuits 59 connect each master oscillator and frequency divider to tone filters 51. Further keying circuits 60, 61, 62 and 63 connect each of the master oscillators and frequency dividers to tone filters 52, 53, 54 and 55 respectively. Keying circuits 58 can be any number of readily available diode or transistor keying circuits. Depression of a key 17 on Manual I operatively connects one of the master oscillators or frequency dividers to the tone filters 50 through a common line 64. Further common lines 65, 66, 67, 68 and 69 connect keying circuits 59, 60, 61, 62 and 63 respectively to tone filters 51, 52, 53, 54 and 55. Lines 64 through 69 are connected to the keying circuits for each of the thirty-seven notes of the respective keyboard, but for simplicity, the extensions of those lines have not been shown on FIGURE 5.

Each of tone filters 50, 51, 52, 53, 54 and 55 is operatively connected to the input of an amplifier 70 which amplifies the signals from one keyboard. One output of each amplifier 70 is connected to a variable resistor 71 for balance adjustment. Each balance adjusting resistor 71 is serially connected to a resistor 72, which is in turn connected to a common line 73. Common line 73 receives signals from each of the six tone filters 50–55 and conducts them to a variable resistor 74 which is serially connected to an input of a further amplifier stage 75. Amplifier 75 has a second input from a vibrato oscillator 76 through an adjustable resistor 77 which controls the depth of the vibrato. Vibrato oscillator 76 is also operatively connected to a variable resistor 78 which provides for frequency adjustment. Vibrato oscillator 76 is turned off and on by a switch 79.

The output from amplifier 75 is fed directly into a means for converting electrical signals into audible sounds, here shown as speaker 80. The sound produced through speaker 80 may represent sounds produced through one or more of the six Manuals. If more than one Manual is being played simultaneously, the sound through speaker 80 has a quality similar to that produced in a normal electronic organ when more than one of the stops are depressed. An on-off switch 81 shorts out speaker 80 when closed so that any or all of the keyboard signals may be cut off from speaker 80.

When it is desired that each pupil hear only the sounds that he himself is producing, a second means of converting the electrical signal to an audible sound is provided. Amplifier 70 has a second output into a further amplifier 82 in parallel with balance adjusting resistor 71. The output of amplifier 82 is fed through a variable resistor 83 to receptacle 35 into which is inserted a jack connected to a set of earphones 84. Thus the output of each Manual is fed into a separate earphone set 84 so that each student can listen to the results of his own playing without hearing what the others are doing. A second input is provided in amplifier 82 through a switch 85 from a device 86 which contains tape recorded instructional sounds. The sounds reproduced in earphone 84 from device 86 can be either verbal instructions or prerecorded music which accompanies the pupil as he plays. Separate devices 86 can be provided for each of the six Manuals or one central device can be used to simultaneously provide the same instructions to all the Manuals.

In operation, power supply 40, when turned on and plugged in, supplies DC power to master oscillators 41 and 42. Depression of a key 17 repersenting high C on Manual I closes a keying circuit 58 allowing conduction of the shaped wave from master oscillator 41 through common line 64 to tone filters 50. Assuming that switch 56 is closed and provides circuitry in tone filters 50 which imparts flute voicing to the signal, the shaped wave from master oscillator 41 is modified to a signal characteristic to that representing the sound of a flute playing high C. This modified signal is amplified by amplifier 70 and transmitted along parallel paths through amplifier 82 and adjustable resistors 71. Further assuming that switch 81 is in the open position, the signal proceeds from variable resistor 71 through resistor 72 and common line 73 to variable resistor 74 and amplifier 75 where it is further amplified and transmitted to speaker 80 where it is converted to an audible sound. A vibrato is added to the sound by closure of switch 79 which activates vibrato oscillator 76. The signal from oscillator 76 is fed through depth control resistor 77 to the second input of amplifier 75 and adds vibrato to the signal from tone filter 50 before it reaches speaker 80.

The signal from amplifier 70 is simultaneously fed through amplifier 82 and variable resistor 83 to receptacle 35 into which the jack for earphone 84 is inserted. The signal can be cut off from speaker 80 by closure of switch 81 in which case the sound produced by depression of keys 17 on the Manual is audibile only through earphones 84. Tape recorded instructional material is simultaneously fed into earphones 84 by closure of switch 85.

Figure 6:
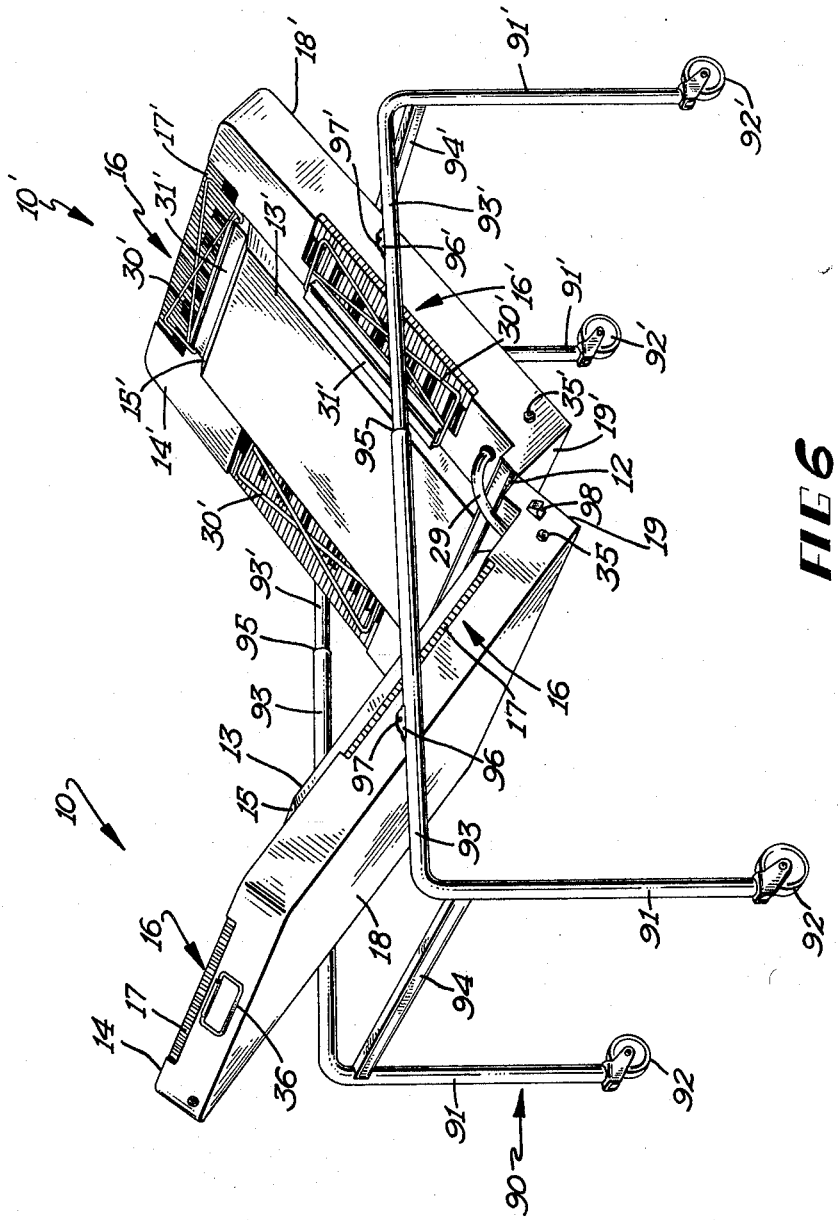
FIGURE 6 is a perspective view of a teaching aid in accordance with the invention including a modified support structure.

FIGURE 6 discloses, in perspective view, a modified support structure for the multiple keyboard teaching aid. The structure of the teaching aid itself is the same as that described with reference to FIGURES 1–4 with the single exception of the provisions made for attaching it to the support structure. The support structure is constructed of two telescoping portions generally designated 90 and 90′. Support structure 90 includes a pair of downwardly extending legs 91 which terminate, at their lower extremities, in a pair of rollers or wheels 92. The upper extremity of each leg 91 is rigidly attached to a horizontally extending hollow tubular member 93. Legs 91 are connected together by a horizontal brace member 94. Each horizontal tubular member 93 terminates in an open end 95 adapted to cooperate with structure 90'. Structure 90' has a pair of downwardly extending legs 91' terminating in a pair of rollers 92'. The legs 91' are each connected to a tubular member 93' which is slightly smaller in diameter than tubular members 93 and adapted to cooperate therewith through open end 95 to form a telescoping structure. Legs 91' are connected together by a horizontal brace 94'. Horizontal members 93, 93', 94 and 94' thus form a substantially horizontal rectangular telescoping structure with four downwardly extending legs on which case portions 10 and 10' are rotatably supported. Members 93 and 93' have upwardly extending slotted projections 96 and 96', respectively, which are adapted to receive pins 97 and 97' extending from the sides of case portions 10 and 10'. Four such projections 96 and 96' cooperate with four pins 97 and 97' to rotatably support case portions 10 and 10'. Case portion 10 is further provided with a pair of spring biased catches 98 on opposite sides immediately adjacent the extremities of end 19 which releasably retain case portions 10 and 10' in the open position until they are manually operated by depressing them against the side of case portion 10.

The procedure for closing the case of the teaching aid shown in FIGURE 6 will now be explained. Assume that the case is in the fully open position with case portions 10 and 10' positioned with ends 19 and 19' abutting one another and catches 98 cooperating with tubular members 93 to maintain lower faces 18 and 18' in a substantially horizontal position with keyboards 16 at a comfortable playing height above the floor. Tubular members 93 and 93' are in the fully extended position. Depression of catches 98 allows case portions 10 and 10' to rotate toward one another about hinge 12. The case is supported at the points of contact between slotted projections 96 and pins 97 and rotates with respect to the support structure about those points. As case portions 10 and 10' rotate with first parts 13 and 13' approaching one another, tubular members 93 and 93' telescope through open ends 95 until first parts 13 and 13' contact one another. FIGURE 6 shows case portions 10 and 10' in an intermediate position between the fully folded and fully open positions. When first parts 13 and 13' contact one another, the support structures 90 and 90' are fully telescoped forming a rectangular rollable structure which is about twenty-eight inches wide and thirty-two inches deep. This structure is suitable for rolling about within a room or through average size doors between rooms. When it is desired to transport the teaching aid over a long distance, case portions 10 and 10' are lifted from the support structure 90 and 90' by grasping handles 36 and 36' and lifting upward. Pins 97 slide up and out of the slots in projections 96 thereby removing the case from contact with support structure 90 and 90' so that each can be transported separately. If desired, the case shown in FIGURE 6 can be set up and opened on top of a table instead of the support structures 90 and 90'.

The embodiments of the invention in which an exclusive property or privilege is claimed are defined as follows:

1. A transportable multiple keyboard teaching aid comprising:
    a plurality of keyboards each having a plurality of keys;
    electronic means adapted to be connected to a power source and operatively connected to the keys for producing electrical signals characteristic of those representing sounds from at least one musical instrument upon depression of the keys when the electronic means is connected to a power source;
    converting means operatively connected to the electronic means for converting the electrical signals to audible sounds; and
    enclosure means permanently housing the keyboards, electronic means and converting means, the enclosure means having two portions movably connected to one another, the portions being movable between a first open position wherein the keyboards are readily accessible for depression of keys and a second closed position wherein the teaching aid is adapted to be readily transported from place to place, each of the portions housing at least one keyboard.

2. A teaching aid according to claim 1 which further comprises:
    support means, movable with respect to the enclosure means, supporting the keyboards at a comfortable height for playing when the enclosure means is in the open position and cooperating with the enclosure means in the closed position to make the teaching aid readily transportable.

3. A teaching aid according to claim 2 wherein:
    the support means includes three pair of foldable legs, two pair of which are attached to a first of the portions, at least the two pair including rolling means at the extremity of each leg thereof farthest from the case, the two pair being foldable toward one another and constructed so that both pair simultaneously contact one side of the first portion.

4. A teaching aid according to claim 2 wherein:
    the support means includes a substantially rectangular telescoping horizontal frame with four downwardly extending legs, each leg having rolling means attached to its lower extremity, and which further comprises:
    means rotatably and removably connecting the enclosure means to the frame so that the portions are movable from the open to the closed positions when connected to the frame as it telescopes; and
    retaining means for releasably retaining the portions in the open position when connected to the frame.

5. A teaching aid according to claim 1 wherein:
    the two enclosure means portions are of substantially equal size, are rotatably attached to one another each portion having an upper face with a first part and a recessed peripheral part housing three keyboards and having a lower face; and wherein
    the portions abut one another end to end to expose the keyboards in the open position and first part to first part in the closed position to protect the keyboards and adapt the teaching aid for transportation from place to place.

6. A multiple keyboard teaching aid comprising:
    a plurality of keyboards, each board having a plurality of keys;
    electronic tone generating means for generating a plurality of signals of different predetermined frequencies, each of the signals providing the sound producing energy for one key of each keyboard;
    filter means associated with each keyboard and operably connected to the tone generating means to modify the signals to those characteristic signals representing sounds of a particular musical instrument upon depression of keys on one keyboard, the filter means being constructed so that separate modified signals are produced when keys on more than one keyboard are depressed;
    converting means operably connected to the filter means to convert the modified signals into audible sounds; and
    a foldable, transportable case permanently housing the keyboards, tone generating means, filter means and converting means;
    the case having two substantially equal portions rotatably attached to one another, each portion having at least one of the keyboards on an upper face thereof and having a lower face, the portions having an open position abutting one another end to end to expose the keyboards for play and a closed position abutting one another upper face to upper face to protect the keyboards and adapt the teaching aid for transportation from place to place.

7. A teaching aid according to claim 6 which further comprises:
  support means supporting the case with the keyboards at a comfortable playing height above the floor when the portions are in the open position and cooperating with the portions in the closed position to make the case readily transportable.

8. A teaching aid according to claim 7 wherein:
  the support means includes a substantially rectangular telescoping horizontal frame with four downwardly extending legs, each leg having rolling means attached to its lower extremity, and which further comprises:
    means rotatably and removably connecting the enclosure means to the frame so that the portions are movable from the open to the closed positions when connected to the frame as it telescopes; and
    retaining means for releasably retaining the portions in the open position when connected to the frame.

9. A teaching aid according to claim 6 wherein:
  each upper face has a first part and at least one recessed peripheral part containing the keyboards; and which further comprises:
    a plurality of music racks, one for each keyboard, attached to the case and each movable between a first stable closed position substantially parallel to the recessed part below the top of the first part and a second stable open position abutting a side of the first part to form a support for sheet music; and
  carrying means attached to the end of each portion opposite that which abuts the other portion in the open position.

10. A teaching aid according to claim 6 wherein:
  the converting means includes a plurality of earphone sets, one for each keyboard, each set operably connected to convert the modified signals from only one keyboard into audible sounds and a single speaker operably connected to convert the modified signals from at least one keyboard into audible sounds.

11. A teaching aid according to claim 10 wherein:
  the filter means produces modified signals from different keyboards which are characteristic of those representing sounds from at least two different instruments.

12. A teaching aid according to claim 10 which further comprises:
  means operatively connected to an earphone set to selectively introduce a signal representing instructional sounds simultaneously with modified signals from the keyboard so that audible sounds in the earphone set simultaneously include both instructional sounds and sounds resulting from key depression.

References Cited

UNITED STATES PATENTS

| | | | |
|---|---|---|---|
| 1,323,218 | 11/1919 | Edison. | |
| 2,072,511 | 3/1937 | Ross | 84—470 |
| 2,544,466 | 3/1951 | Meacham | 84—1.17 |
| 3,255,295 | 6/1966 | Gianella | 84—1.01 |

FOREIGN PATENTS

| | | |
|---|---|---|
| 1,455,616 | 9/1966 | France. |

HERMAN KARL SAALBACH, Primary Examiner

F. PRINCE BUTLER, Assistant Examiner

U.S. Cl. X.R.

84—1.04, 176, 470